(12) United States Patent
Lazier et al.

(10) Patent No.: US 8,103,967 B2
(45) Date of Patent: Jan. 24, 2012

(54) GENERATING AND ORGANIZING REFERENCES TO ONLINE CONTENT

(75) Inventors: Ariel J. Lazier, Seattle, WA (US); Hugh E. Williams, Redmond, WA (US); Timothy C. Hoad, Kirkland, WA (US); Joshua Edward Smith, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 790 days.

(21) Appl. No.: 11/848,378

(22) Filed: Aug. 31, 2007

(65) Prior Publication Data
US 2009/0064007 A1    Mar. 5, 2009

(51) Int. Cl.
G06F 3/048 (2006.01)
G06F 17/00 (2006.01)
G06F 17/30 (2006.01)
G06F 3/00 (2006.01)
G06F 7/00 (2006.01)
G06F 3/041 (2006.01)

(52) U.S. Cl. ........ 715/811; 715/206; 715/757; 715/745; 715/764; 707/999.003

(58) Field of Classification Search .................. 715/757, 715/206, 811, 745; 707/999.003
See application file for complete search history.

(56) References Cited

U.S. PATENT DOCUMENTS

| | | | |
|---|---|---|---|
| 5,963,964 A * | 10/1999 | Nielsen | 715/255 |
| 6,353,448 B1 * | 3/2002 | Scarborough et al. | 715/744 |
| 6,370,541 B1 * | 4/2002 | Chou et al. | 707/E17.032 |
| 6,484,149 B1 * | 11/2002 | Jammes et al. | 705/26 |
| 6,546,393 B1 * | 4/2003 | Khan | 709/203 |
| 6,708,162 B1 * | 3/2004 | Morgan et al. | 707/999.003 |
| 7,031,961 B2 * | 4/2006 | Pitkow et al. | 707/E17.114 |
| 7,216,290 B2 | 5/2007 | Goldstein | |
| 7,266,546 B2 * | 9/2007 | Son | 1/1 |
| 7,340,446 B2 * | 3/2008 | Rajarajan et al. | 1/1 |

(Continued)

FOREIGN PATENT DOCUMENTS

WO    WO0155909 A1    8/2001

(Continued)

OTHER PUBLICATIONS

Huang et al., Desktop search in the intranet with integrated desktop search engines, 2008, Computer Systems Architecture Conference, 2008. ACSAC 2008. 13th Asia-Pacific, p. 1-4.*

(Continued)

*Primary Examiner* — Chat Do
*Assistant Examiner* — Jordany Nunez
(74) *Attorney, Agent, or Firm* — Shook Hardy & Bacon L.L.P.

(57) ABSTRACT

Systems, methods, and computer storage media for generating a virtual workspace that references online media content of interest, facilitates re-visitation of encountered instances of content, and shares those instances with other software applications are provided. Upon receiving an indication that an online media content item has been selected, at least a reference thereto is copied to a virtual workspace where it may be accessed at a later time. The virtual workspace may be organized into content collections via the use of reference groupings, folders, categories, tags, labels, and the like and may be accessible in the context of a plurality of applications. In embodiments, the virtual workspace is associated with a display area that is presented concurrently with an application being utilized so that the virtual workspace may be accessed and utilized without leaving the context of an active application.

17 Claims, 11 Drawing Sheets

U.S. PATENT DOCUMENTS

| | | | |
|---|---|---|---|
| 7,349,913 B2* | 3/2008 | Clark et al. ............................ 1/1 |
| 7,836,411 B2* | 11/2010 | Plow et al. .................... 715/811 |
| 7,840,614 B2* | 11/2010 | Owen et al. ................... 707/821 |
| 7,921,375 B2* | 4/2011 | Laird-McConnell ......... 715/781 |
| 2005/0027702 A1* | 2/2005 | Jensen et al. ...................... 707/3 |
| 2005/0177401 A1 | 8/2005 | Koeppel |
| 2005/0203801 A1 | 9/2005 | Morgenstern |
| 2005/0210145 A1 | 9/2005 | Kim |
| 2006/0041830 A1 | 2/2006 | Bohn |
| 2006/0112079 A1 | 5/2006 | Holt |
| 2006/0218499 A1* | 9/2006 | Matthews et al. ............. 715/765 |
| 2006/0242126 A1* | 10/2006 | Fitzhugh .......................... 707/3 |
| 2006/0248453 A1 | 11/2006 | Bennett |
| 2007/0011130 A1 | 1/2007 | Yamabuchi |
| 2007/0112913 A1 | 5/2007 | Bales |
| 2007/0129977 A1* | 6/2007 | Forney .............................. 705/7 |
| 2007/0276811 A1* | 11/2007 | Rosen ................................ 707/3 |
| 2008/0268418 A1* | 10/2008 | Tashner et al. ................ 434/365 |
| 2009/0024585 A1* | 1/2009 | Back et al. ........................ 707/3 |
| 2009/0319472 A1* | 12/2009 | Jain et al. .......................... 707/2 |

FOREIGN PATENT DOCUMENTS

WO     WO2007059237 A2     5/2007

OTHER PUBLICATIONS

Sclaroff, Stan et al., "ImageRover: A Content-Based Image Browser for the World Wide Web", Proc. IEEE Workshop on Content-based Access of Image and Video Libraries, Jun. 1997, http://citeseer.ist.psu.edu/cache/papers/cs/245/http:zSzzSzwww.cs.bu.eduzSztechreportszSz97-005-imagerover.pdf/sclaroff97imagerover.pdf.

Jhaveri, Natalie, "Intermediate and Post-Session Web Page Revisitation Techniques and Tools", University of Tampere Department of Computer Sciences, Sep. 2004, http://www.cs.uta.fi/research/theses/masters/Jhaveri_Natalie.pdf.

* cited by examiner

GENERATING AND ORGANIZING REFERENCES TO ONLINE CONTENT

BACKGROUND

The amount of media content that can be encountered by an online user has steadily grown to the enormous proportions that are currently available to Internet users. Whether a user wants to view photographs, listen to audio, or watch video, the opportunities and options are virtually limitless. While seeking out media content has become easier utilizing a number of web sites that continually improve search methods, improvements regarding the ability to save that content for later access have not been as plentiful. Typically, methods that a user can use to revisit encountered media content files of interest involve saving the media content file itself (viable only for small files or limited amounts of content) or utilizing a function specific to a particular web site, thus making the content available only within the context of the particular web site or in accordance with particular file sharing and distribution guidelines.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to methods and systems for aiding users in tracking online media content of interest. Upon receiving an indication that an online media content item has been selected, at least a reference thereto is copied to a virtual workspace where it may be accessed at a later time. The virtual workspace may be organized into content collections via the use of folders, categories, tags, labels, and the like and may be accessible in the context of a plurality of applications. In embodiments, the virtual workspace is associated with a display area that is presented concurrently with an application being utilized so that the virtual workspace may be accessed and utilized without leaving the context of an active application.

BRIEF DESCRIPTION OF THE DRAWINGS

Embodiments are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer storage media having computer-executable instructions embodied thereon that, when executed, perform methods in accordance with embodiments hereof, for aiding users in tracking online media content of interest. Upon receiving an indication that an online media content item has been selected, at least a reference thereto is copied to a virtual workspace where it may be accessed at a later time. The virtual workspace may be organized into content collections via the use of folders, categories, tags, labels, and the like and may be accessible in the context of a plurality of applications. In embodiments, the virtual workspace is associated with a display area that is presented concurrently with an application being utilized so that the virtual workspace may be accessed and utilized without leaving the context of an active application.

Having briefly described an overview of embodiments of the present invention, an exemplary operating environment suitable for implementing embodiments hereof is described below.

Figure 1:
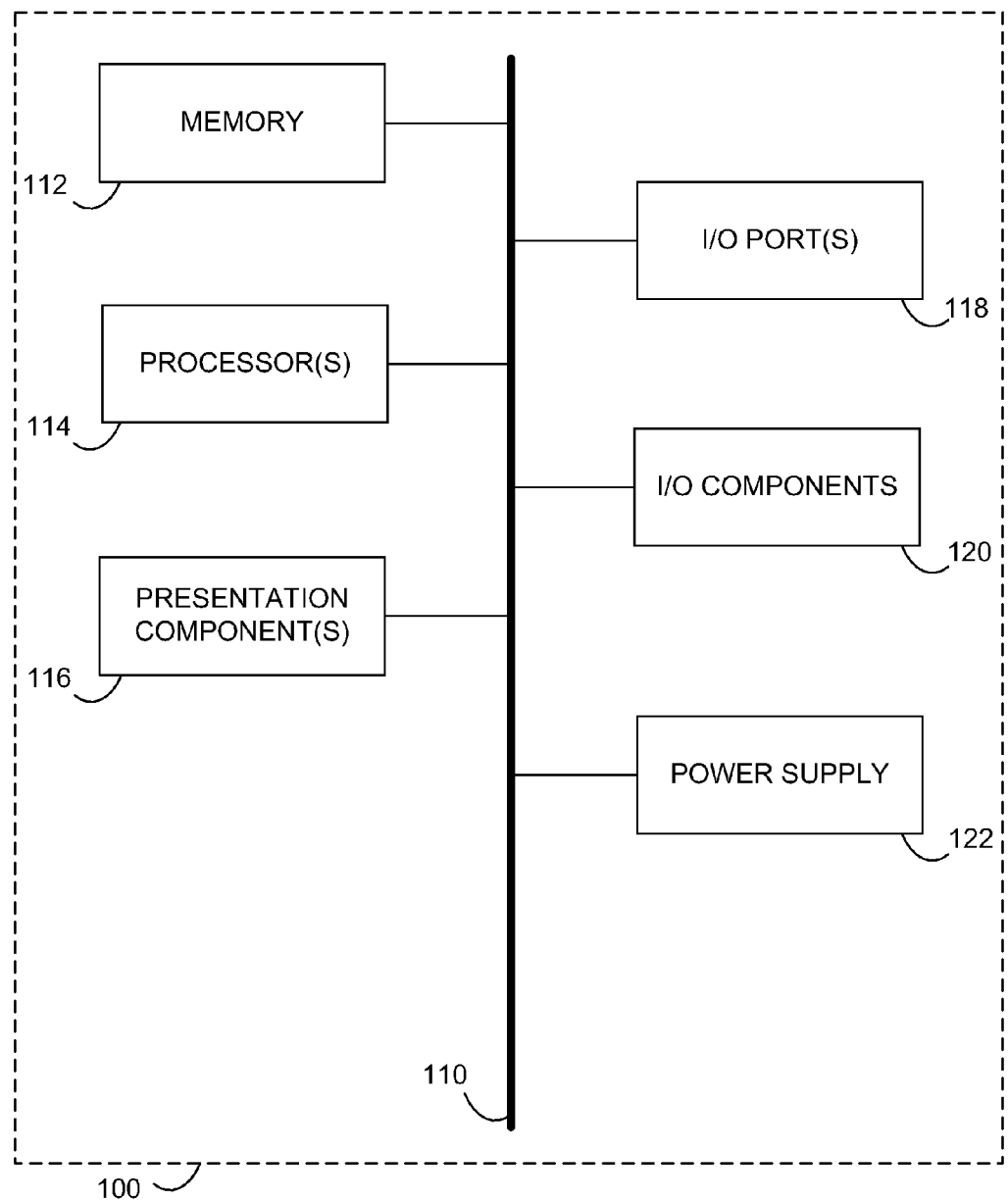
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/modules illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

Figure 2:
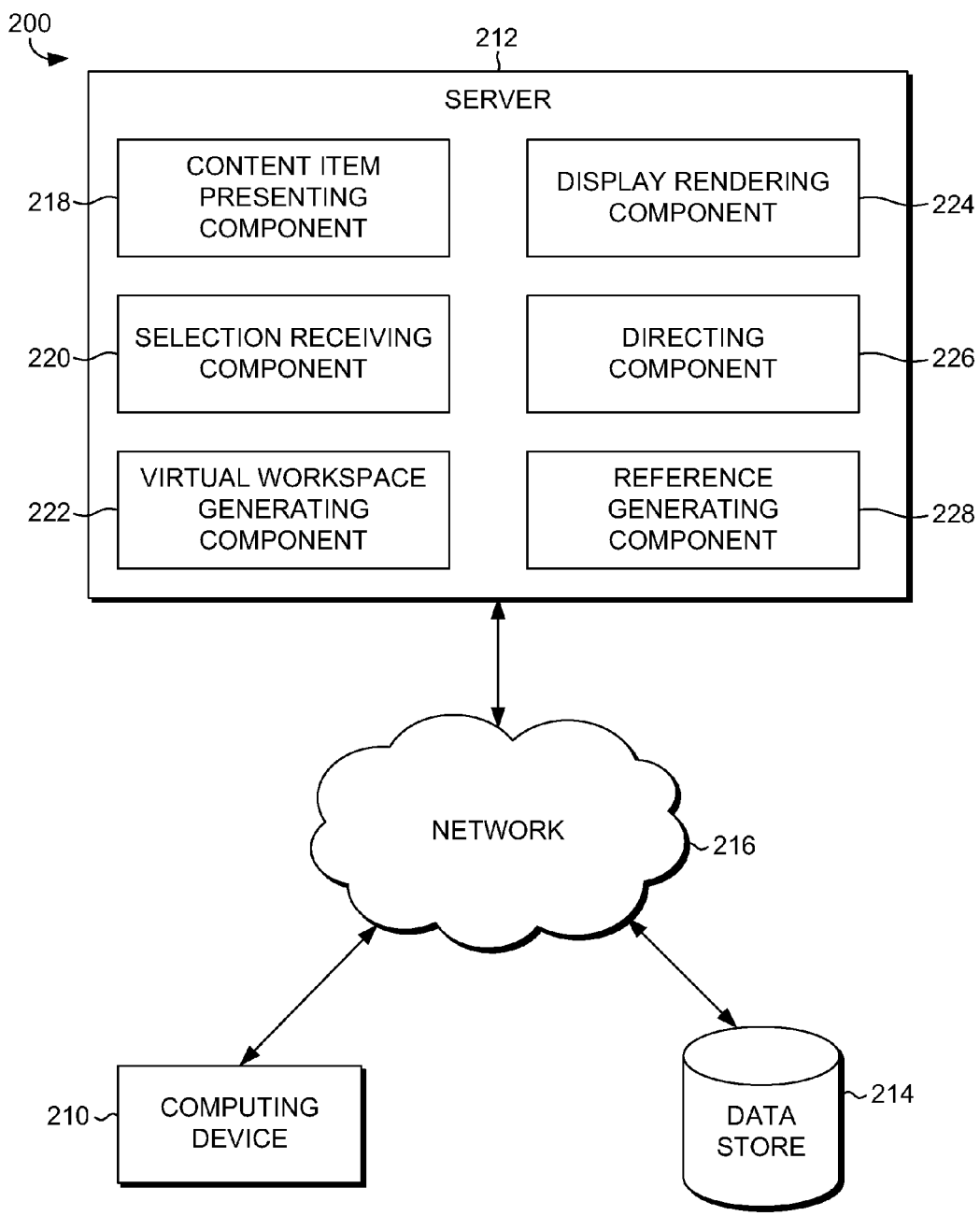
FIG. 2 is a block diagram of an exemplary computing system suitable for use in implementing embodiments of the present invention.

Turning now to FIG. 2, a block diagram is illustrated, in accordance with an embodiment of the present invention, showing a system 200 configured to facilitate the tracking and organizing of online content items of interest. It will be understood and appreciated by those of ordinary skill in the art that the content tracking and organizing system 200 shown in FIG. 2 is merely an example of one suitable computing system environment and is not intended to suggest any limitation as to the scope of use or functionality of embodiments of the present invention. Neither should the system 200 be interpreted as having any dependency or requirement related to any single component or combination of components illustrated therein. Further, the system 200 may be provided as a stand-alone product, as part of a software development environment, or any combination thereof.

The system 200 includes a user computing device 210, a server 212, and a data store 214 all in communication with one another via a network 216. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The data store 214 is configured to store one or more virtual workspaces and their associated references, reference representations and user information (as more fully described below). In various embodiments, such information may include, without limitation, user identifications, references to online content items (and/or representations thereof), reference groupings, and the like. In embodiments, the data store 214 is configured to be searchable for one or more of the items stored in association therewith. It will be understood and appreciated by those of ordinary skill in the art that the information stored in the data store 214 may be configurable and may include any information relevant to virtual workspaces and associated user identification information. The content and volume of such information are not intended to limit the scope of embodiments of the present invention in any way. Further, though illustrated as a single, independent component, data store 214 may, in fact, be a plurality of data stores, for instance, a database cluster, portions of which may reside on the user computing device 210, the server 212, another external computing device (not shown), and/or any combination thereof.

Each of the computing device 210 and the server 212 shown in FIG. 2 may be any type of computing device, such as, for example, computing device 100 described above with reference to FIG. 1. By way of example only and not limitation, each of the computing device 210 and the server 212 may be a personal computer, desktop computer, laptop computer, handheld device, mobile handset, consumer electronic device, and the like. Additionally, the user device 210 may further include a keyboard, keypad, stylus, joystick, and any other input-initiating component that allows a user to provide wired or wireless data to the network 216. It should be noted, however, that the present invention is not limited to implementation on such computing devices, but may be implemented on any of a variety of different types of computing devices within the scope of embodiments hereof.

As shown in FIG. 2, the server 212 is configured to receive selection of one or more content items from a plurality of displayed content items and generate a virtual workspace and associated display area for displaying references and/or reference representations to the selected content items. The server includes a content item presenting component 218, a selection receiving component 220, a virtual workspace generating component 222, a display rendering component 224, a directing component 226, and a reference generating component 228. In some embodiments, one or more of the illustrated components 218, 220, 222, 224, 226 and 228 may be implemented as stand-alone applications. In other embodiments, one or more of the illustrated components 218, 220, 222, 224, 226 and 228 may be integrated directly into the operating system of the server 212. Still other embodiments integrate one or more of components 218, 220, 222, 224, 226 and 228 in the computing device 210. It will be understood by those of ordinary skill in the art that the components 218, 220, 222, 224, 226 and 228 illustrated in FIG. 2 are exemplary in nature and in number and should not be construed as limiting. Any number of components may be employed to achieve the desired functionality within the scope of embodiments of the present invention.

The content item presenting component 218 is configured for presenting a plurality of online content items, for instance, as results of a search engine operation or database query.

Presented content items are generally visually presented utilizing a display device associated with a computing device (e.g., computing device 210). However, it is contemplated to be within the scope of embodiments hereof that presenting online content items may include audible presentation or a combination of audible and visual presentation as well.

The selection receiving component 220 is configured for receiving an indication that one of the plurality of online content items (or an associated reference or representation, as more fully described below) has been selected. Typically, such indications will be the result of a user indicating a preference for one presented content item relative to other presented content items, for instance, via a mouse click or function key selection. In embodiments, the selection receiving component 220 is further configured for receiving an indication to perform a specified action (e.g., deleting or organizing) with respect to one or more references (or representations thereof) associated with a virtual workspace. In further embodiments, the selection receiving component 220 is configured for receiving an indication from a target software application that access to the virtual workspace and any references (and/or representations) associated therewith is desired. Again, such indications typically will be the result of a user indicating his or her desire that the indicated action be performed, for instance, via a mouse click or function key selection.

The virtual workspace generating component 222 is configured for generating and providing a virtual workspace having one or more online media content items (or associated references or representations, as more fully described below) associated therewith. The virtual workspace is an area of memory used for tracking online media content items of interest and/or creating collections of such content items. As such, a virtual workspace may be established for each user of a computing device, whether shared or individual, based upon user authentication to that computing device. Typically, representations of references to online media content items of interest are presented in association with a display area associated with the virtual workspace, as more fully described below.

The display rendering component 224 is configured for rendering information to be displayed in association with a display area associated with the virtual workspace, the display area including one or more representations associated with references to online content items of interested (e.g., selected content items). The display area may be associated with a web browser or it may be a display area that is distinct from the web browser itself. Further, the display may be a pop-up window of a browser or may be included within a frame. The nature of the display area is not intended to limit the scope of the present invention in any way but rather any display area that is accessible within the context of the active application is contemplated to be within the scope of embodiments hereof.

The directing component 226 is configured for directing the web-browsing application to an original Uniform Resource Locator (URL) associated with a selected reference or an updated URL if the selected reference is moved after selection. That is, upon appropriate selection of a content item (or its associated reference or representation) associated with a virtual workspace in the context of a web-browsing application, the web-browsing application may be directed to the URL originally associated with the content item or the updated URL associated with the content item if relocation of the item has occurred. This allows a user to re-visit previously selected content items at a later instance in time.

The reference generating component 228 is configured for generating references to selected content items. In embodiments, references are created for the specific online content item selected rather than for the entire web page with which the selected content item is associated. For example, a picture file of any standard format may be a reference, although embodiments hereof are equally applicable to a number of file formats including, without limitation, photographs, audio files, video files, streaming media files, animated graphics, icons, and any combination thereof. In other embodiments, the reference may be generated prior to selection of the content item and available for subsequent selection and use.

Figure 3:
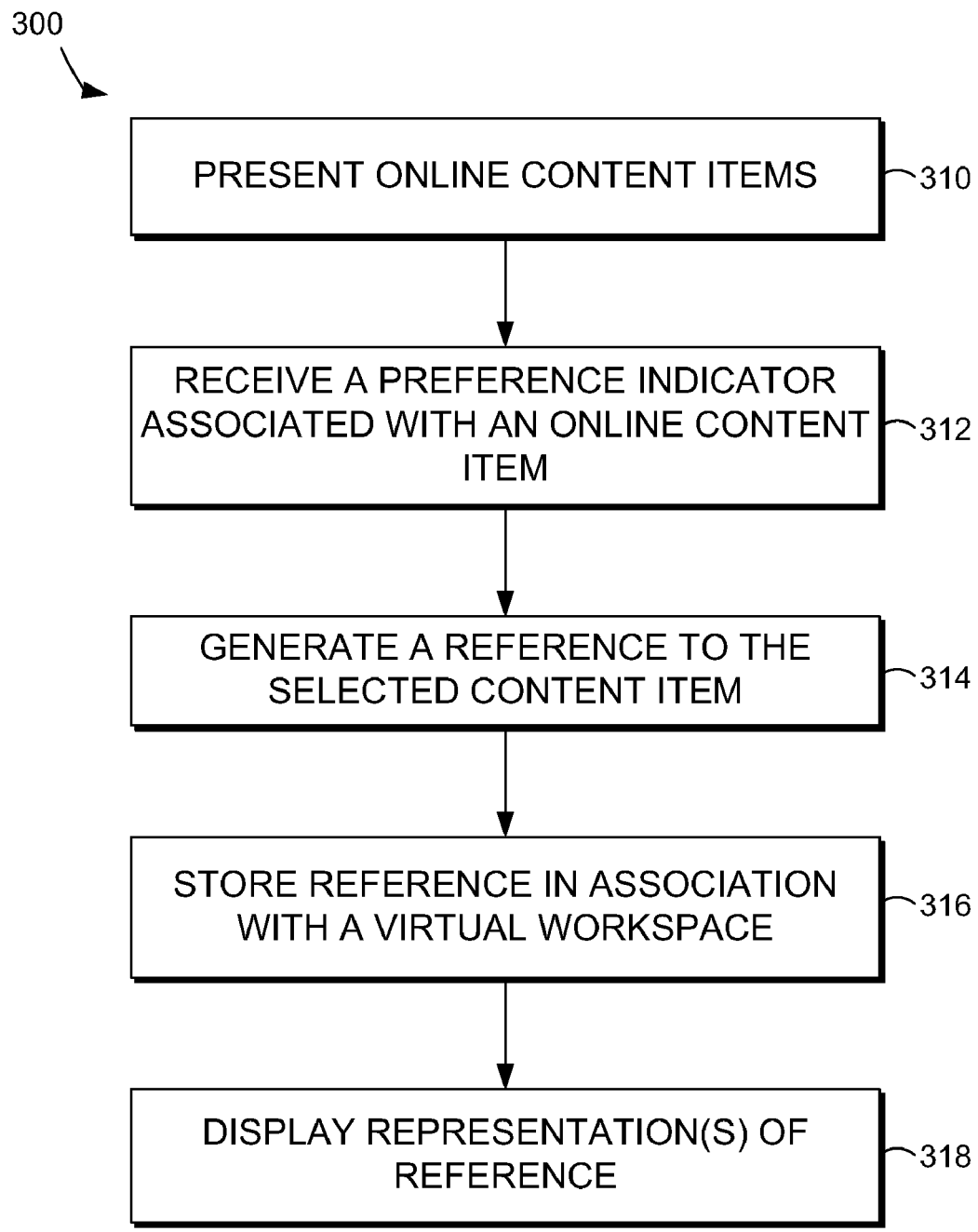
FIG. 3 is a flow diagram showing a method for generating references to online content, in accordance with an embodiment of the present invention.

Turning now to FIG. 3, a flow diagram is illustrated that shows a method 300 for generating references to online content, in accordance with an embodiment of the present invention. Initially, as indicated at block 310, one or more online content items are presented (e.g., utilizing content item presenting component 218 of FIG. 2). By way of example and not limitation, the content items may be presented to a user as results of a search engine operation. Next, as indicated at block 312, a preference indicator associated with one of the presented online content items is received, for instance, utilizing selection receiving component 220 of FIG. 2. The preference indicator may take a number of forms and therefore a multitude of different preference indicators are contemplated within the scope of embodiments hereof. In embodiments, the preference indicator is a mouse click. In other embodiments, the preference indicator is a "click-and-drag" operation or a series of joystick or keypad commands. In other embodiments, the preference indicator initially is received through electronic input, but ultimately is the result of speech-recognition conversion of spoken commands or the conversion of gesturing user interfaces (UIs). It will be understood and appreciated by those of ordinary skill in the art that the nature of the preference indicator is not intended to limit the scope of the present invention in any way.

Next, as indicated at block 314, a reference to the selected content item, i.e., the content item associated with the preference indicator, is generated (e.g., utilizing reference generating component 228 of FIG. 2). It should be noted that in certain embodiments, the reference may be generated prior to a preference indicator being received. In such embodiments, selection of the content item may involve sending a pre-generated reference back to the server rather than the reference being generated per se. Any and all such embodiments, and any combination thereof, are contemplated to be within the meaning of the term "generated" as utilized herein.

Next, as indicated at block 316, the reference is stored in association with the virtual workspace (e.g., utilizing data store 214 of FIG. 2). The memory allocated for the virtual workspace may be local to the computing device being utilized (e.g., computing device 210 of FIG. 2), may be associated with a web server for access from any computer with an Internet connection, may be associated with a web-browser cookie file associated with the user, or any combination thereof. In an embodiment wherein the virtual workspace is stored in association with a web-browser cookie file, any authorized access to the virtual workspace prior to expiration of the cookie will allow the user to retain the workspace contents.

Next, one or more representations of the reference are generated and presented in a display area associated with the virtual workspace (e.g., utilizing display rendering component 224 of FIG. 2). This is indicated at block 318. Examples of suitable representations include resized images of an original picture, or a reformatted picture that uses a less-memory-intensive file format. In one embodiment, thumbnail images for a standard format and size are utilized to represent links to the referenced content items. The thumbnails may be of uniform appearance depending on file format, or may be specifically suited to the individual reference. Any and all such embodiments, and any combination thereof, are contemplated to be within the scope of embodiments of the present invention.

Once a reference and representation are available and associated with a virtual workspace, a number of specified actions may be performed with regard to those items. For instance, content items may be removed via selection of the associated reference thereto and subsequent performance, e.g., of a keyboard delete command, a click-and-drag operation, or the like. Further, previously generated references and their respective representations may be arranged and organized as desired. Such organization may include, without limitation, grouping certain references and assigning them respective names, ordering the representations in the display, or hiding portions of the displayed representations. These examples are not intended to be exhaustive but are merely examples of specified actions that may be desired with respect to a content item collection.

Figure 4:
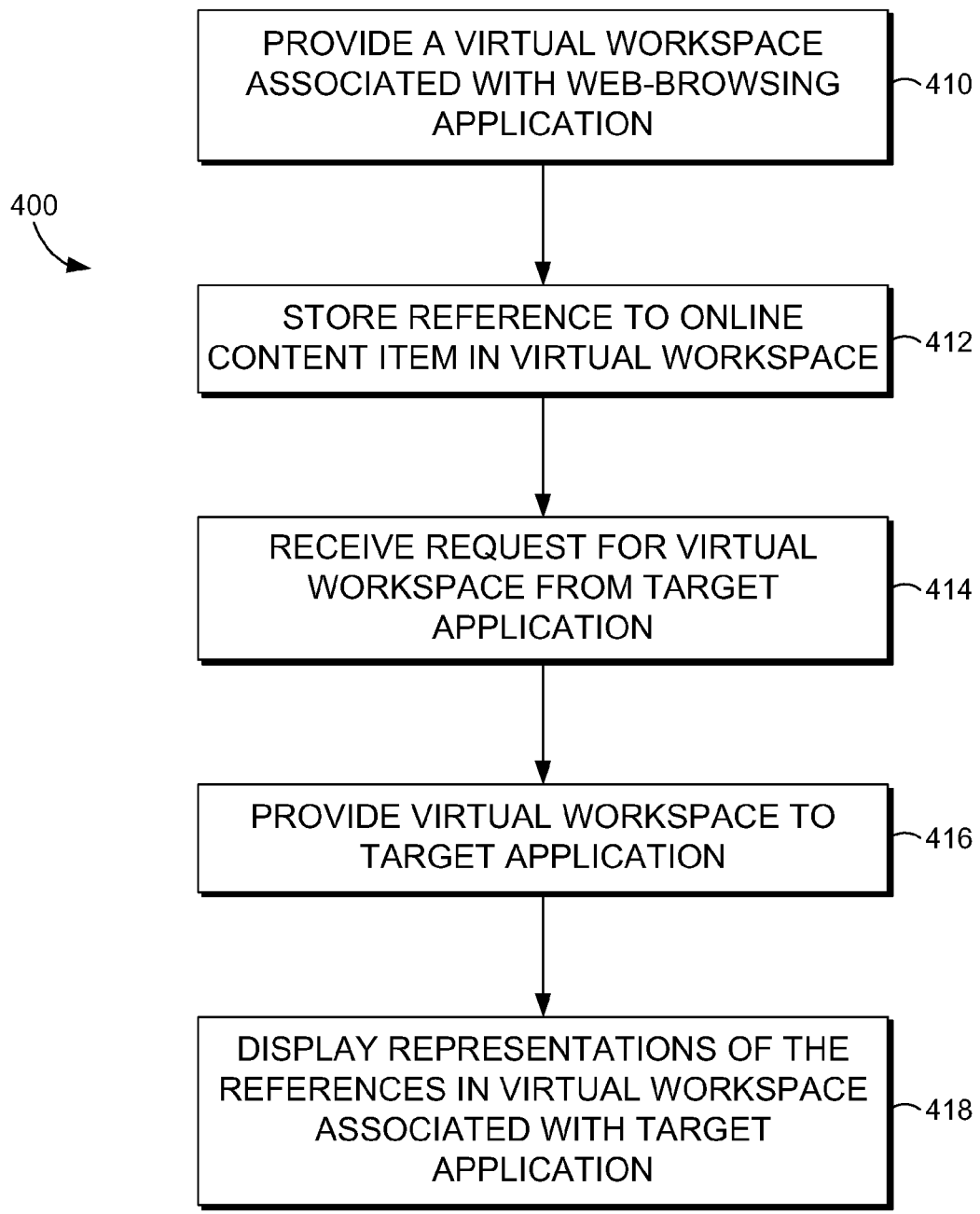
FIG. 4 is a flow diagram showing a method for making online media content associated with a web-browsing application available to a target software application, in accordance with an embodiment of the present invention.

Turning now to FIG. 4, a flow diagram is illustrated showing a method 400 for making online media content associated with a web-browsing application available to a target software application, in accordance with an embodiment of the present invention. Initially, as indicated at block 410, a virtual workspace associated with the web-browsing application is provided, for instance, utilizing virtual workspace generating component 222 of FIG. 2. Subsequently, as indicated at block 412, at least one reference to an online content item of interest is stored in association with the virtual workspace. Depending on the context of the associated application, such storage may be local in association with a user's computing device (e.g., computing device 210 of FIG. 2), in association with a server accessible via the Internet, or in association with a web-browser cookie file associated with a particular user. All such variations, and any combination thereof, are contemplated to be within the scope of embodiments of the present invention.

Next, as indicated at block 414, a request is received from a target software application (for instance, utilizing selection receiving component 220 of FIG. 2) that access to the virtual workspace and/or one or more of the references stored in association therewith is desired. Upon receipt of such request (which may be configured to be automatic upon initiation of the target software application, if desired), access to the virtual workspace is provided to the target application, as indicated at block 416. Subsequently, as indicated at block 418, one or more representations of any references stored in association with the virtual workspace are presented in association with the target application. This may be accomplished, for instance, utilizing display rendering component 224 of FIG. 2.

Once access to the virtual workspace is made available to the target application, any actions that are capable of being performed with respect to the representations and/or associated references to online content in the context of the web-browsing application may be likewise performed in the context of the target software application. For instance, representations and/or their associated references may be deleted, organized into references groupings (that may be hidden from view as desired), and the like. Further, any actions performed with respect to the references and/or representations associated with the virtual workspace in the context of the target software application will be carried over even when the virtual workspace is later accessed in the context of the web-browsing application. That is, if after changes are made to the virtual workspace in the context of the target software application, the virtual workspace is accessed through the web-browsing application, the changes made will persist despite the change in application context.

Figure 5:
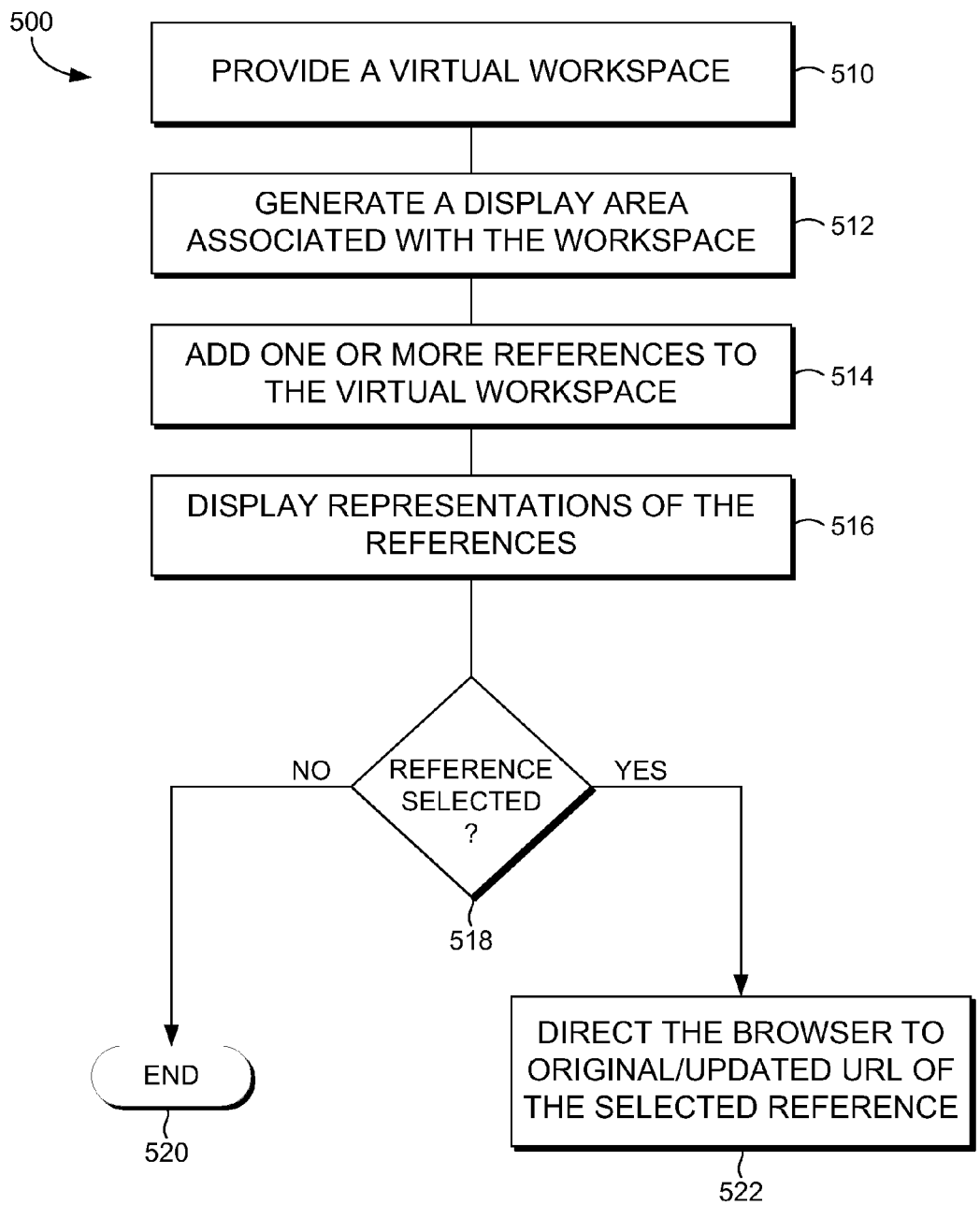
FIG. 5 is a flow diagram showing a method for generating virtual workspaces that facilitate re-visitation of online media content encountered through a web-browsing application, in accordance with an embodiment of the present invention.

With reference now to FIG. 5, a flow diagram is illustrated that shows a method 500 for generating virtual workspaces that facilitate re-visitation of online media content encountered through a web-browsing application, in accordance with an embodiment of the present invention. Initially, as indicated at block 510, a virtual workspace is provided (e.g., utilizing virtual workspace generating component 222 of FIG. 2). Next, as indicated at block 512, a display area associated with the virtual workspace is generated, for instance, utilizing display rendering component 224 of FIG. 2. Next, upon receiving an appropriate indication, one or more references to online content items are added to the virtual workspace, as indicated at block 514.

Next, as indicated at block 516, one or more representations of the added references are presented in association with the display area associated with the virtual workspace, e.g., utilizing display rendering component 224. It is subsequently determined if an indication that one of the references presented in association with the virtual workspace has been received. This is indicated at block 518. If no such indication has been received, the method terminates, as indicated at block 520. If, however, an indication is received that one of the references presented in association with the virtual workspace has been received, the browser is subsequently directed to the original URL associated with the selected reference, or an updated URL as applicable, as indicated at block 522. In this way, a user may revisit at a later time, content previously encountered and indicated to be of interest without having to re-locate the content item from scratch or within a webpage. Rather, the user may be directed directly to the content item of interest.

Figure 8:
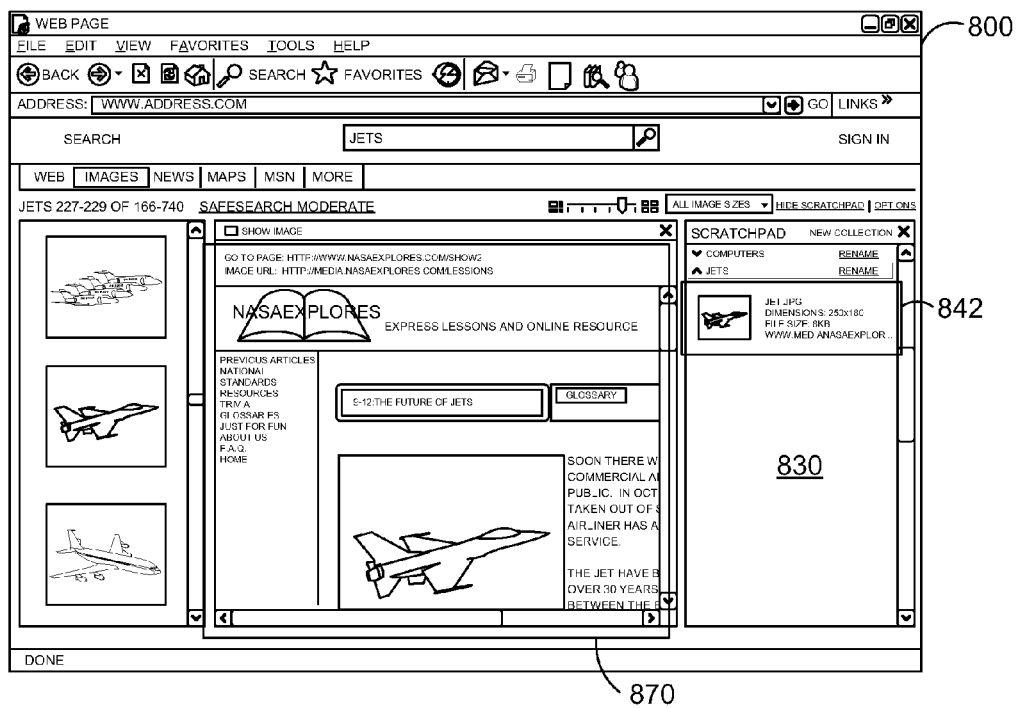
FIG. 8 is an exemplary screen display showing the result of facilitated re-visitation of online media content of interest, in accordance with an embodiment of the present invention.

With reference to FIG. 8, an exemplary screen display is shown illustrating the result of facilitated re-visitation of online media content of interest, in accordance with an embodiment of the present invention. A web browser 800 with a display area 830 and a reference 842 is illustrated. A web frame 870 is opened to show the web page from which the reference 842 originated. In the exemplary screen display, web frame 870 is opened within the same browser instance and is only a portion of the display. However, re-visitation of the original or updated URL may take the form of re-direction to the original or updated URL within the web browser using the entire browser display area, if desired. In other embodiments, the original or updated URL may be re-visited in a pop-up window. Any and all such embodiments, and any combination thereof, are contemplated to be within the scope hereof.

Figure 6A:
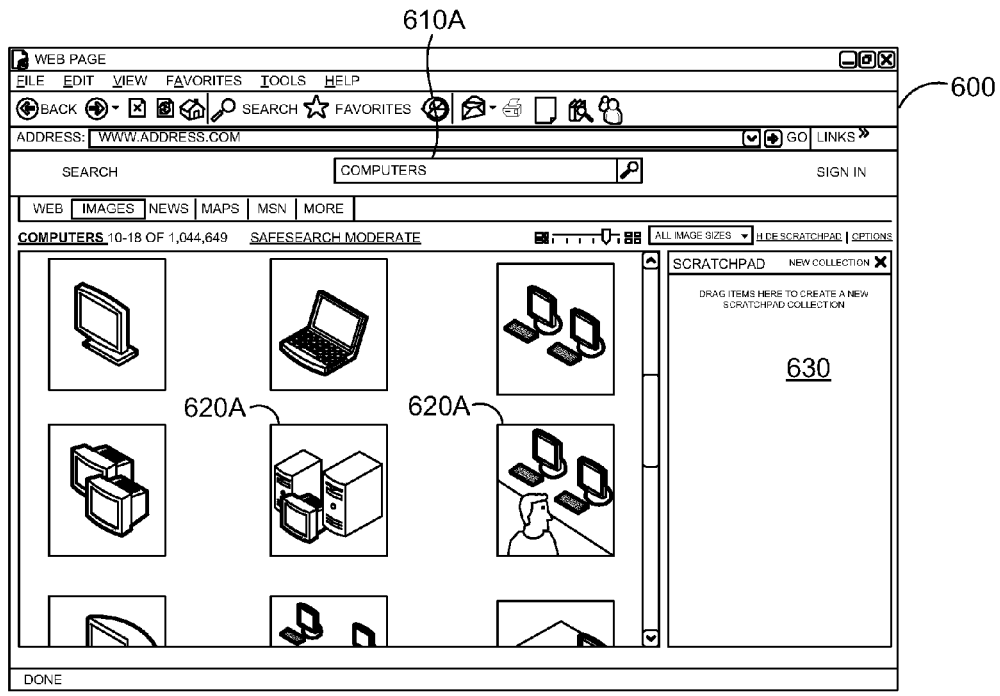
FIGS. 6A-6E are exemplary screen displays showing the addition and arrangement of online media content in a virtual workspace associated with a display, in accordance with embodiments of the present invention.

Turning now to FIGS. 6A-6E, exemplary screen displays are shown illustrating the addition and arrangement of online media content in a virtual workspace associated with a display, in accordance with an embodiment of the present invention. Referring initially to FIG. 6A, a web browser display 600 is shown. The browser display contains a number of elements. Among them are a search term receiving and display area 610A, a plurality of online media content items 620A (each responsive to a search term input into search term receiving and display area 610A) and a display area 630 that is associated with a virtual workspace. In the screen display of FIG. 6A, no content items are associated with the display area 630 indicating that no preference indicators have yet been received. In the depicted embodiment, a message is shown in display area 630 notifying a user that it is available to assist with tracking and organization of online content items as desired.

Figure 6B:
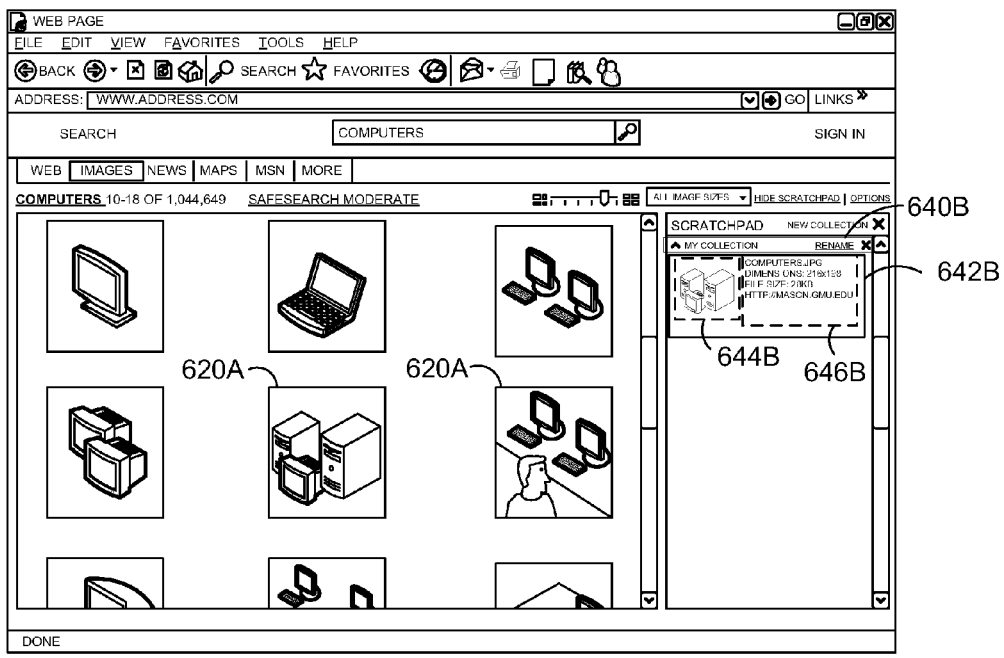

Turning to FIG. 6B, the content of display area 630 has changed indicating that a preference indicator has been received. A name associated with a reference group 640B is displayed. In this instance, the name represents the default title "My Collection" and an ability to rename the group is provided. A reference 642B to the selected content item (that is, the content item associated with the received preference indicator) is provided and includes a representation 644B of the reference and some additional information 646B describing the reference and/or its representation. In the illustrated embodiment, the information 646B includes an original name of the image (i.e., selected content item), a set of dimensions of the original image, an original file size and an original or updated URL at which the image was or currently can be found. Including more or less information associated with the reference is contemplated within the claimed embodiments and the inclusion of specific information should not be construed as limiting in nature.

Figure 6C:
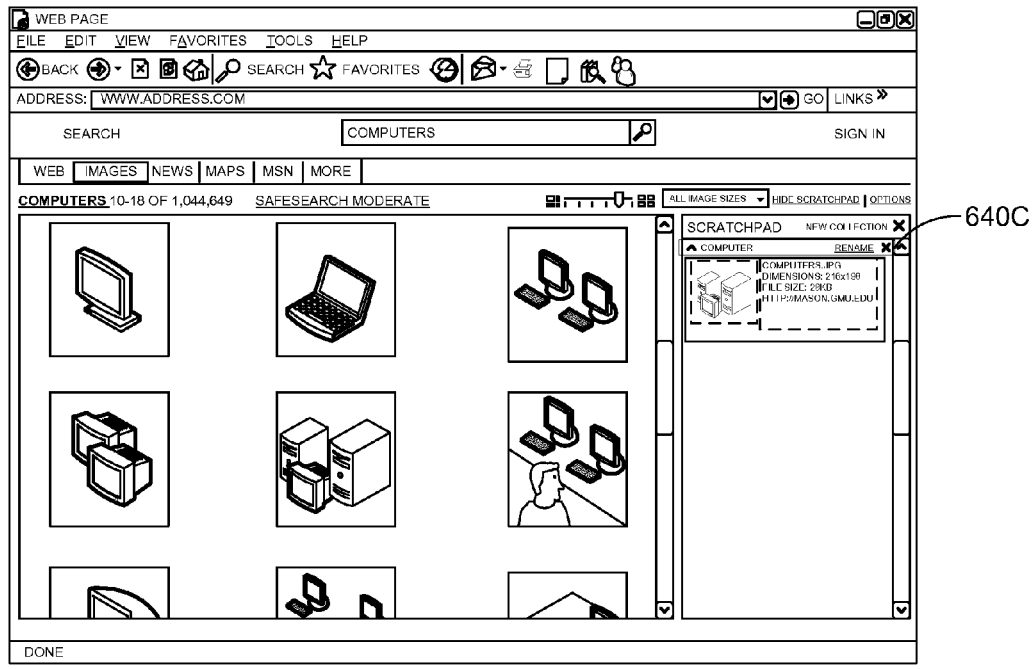
Figure 6D:
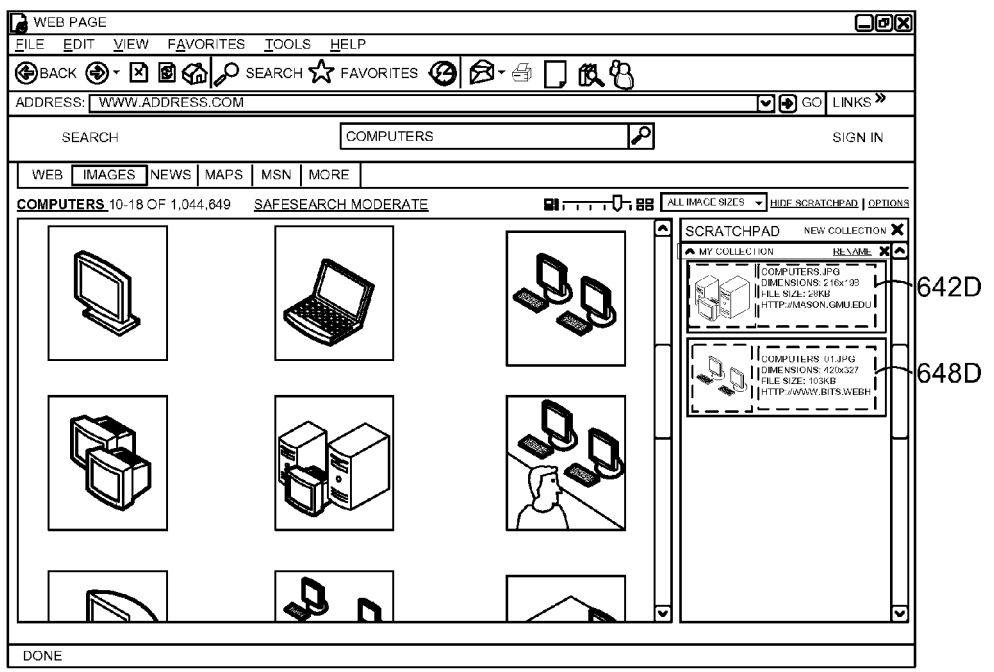
Figure 6E:
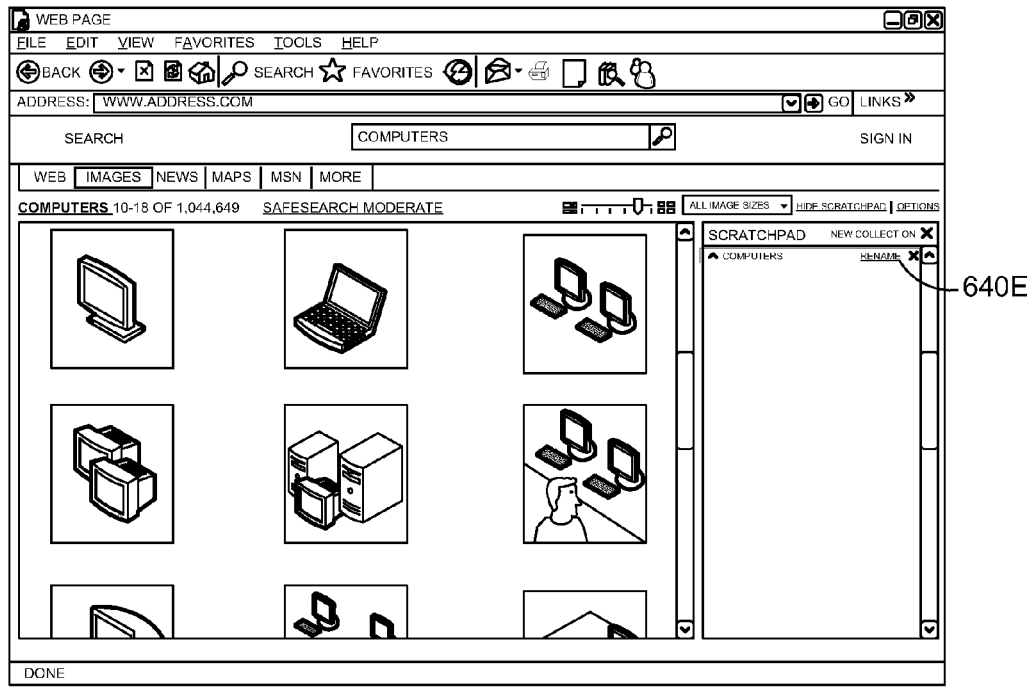

FIGS. 6C, 6D, and 6E show a series of changes that can be made to reference group 640B once it has been created. FIG. 6C shows a modified group title 640C indicating that the default group name of "My Collection" has been changed to read "computers" to more accurately reflect the contents of the group. FIG. 6D shows the addition of a second reference 648D to the group, such that reference 642D and reference 648D are now both displayed in association with reference group 640B. FIG. 6E shows that reference group 640E has been hidden from view. Upon hiding reference group 640E, the references associated therewith (that is, references 642D and 648D of FIG. 6D) are also hidden from view. Multiple reference groups and the ability to hide one or more of them from view provide the user with increased flexibility and utility in organizing and tracking content of interest.

Figure 7A:
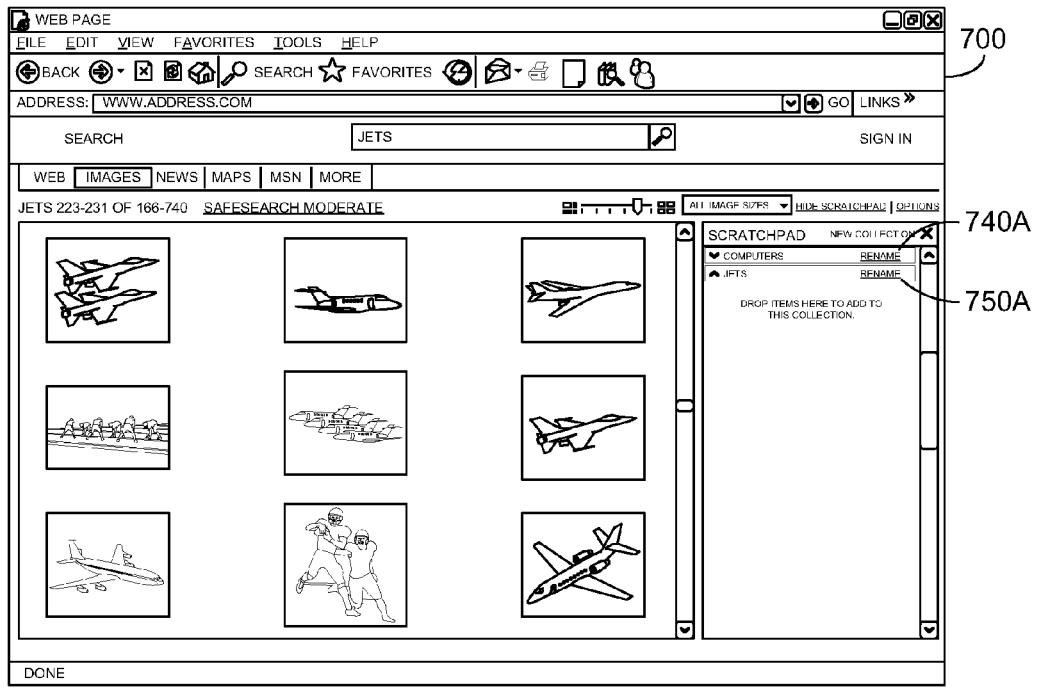
FIGS. 7A-7E are exemplary screen displays showing the arrangement of online media content in a virtual workspace associated with a display, in accordance with embodiments of the present invention.
Figure 7B:
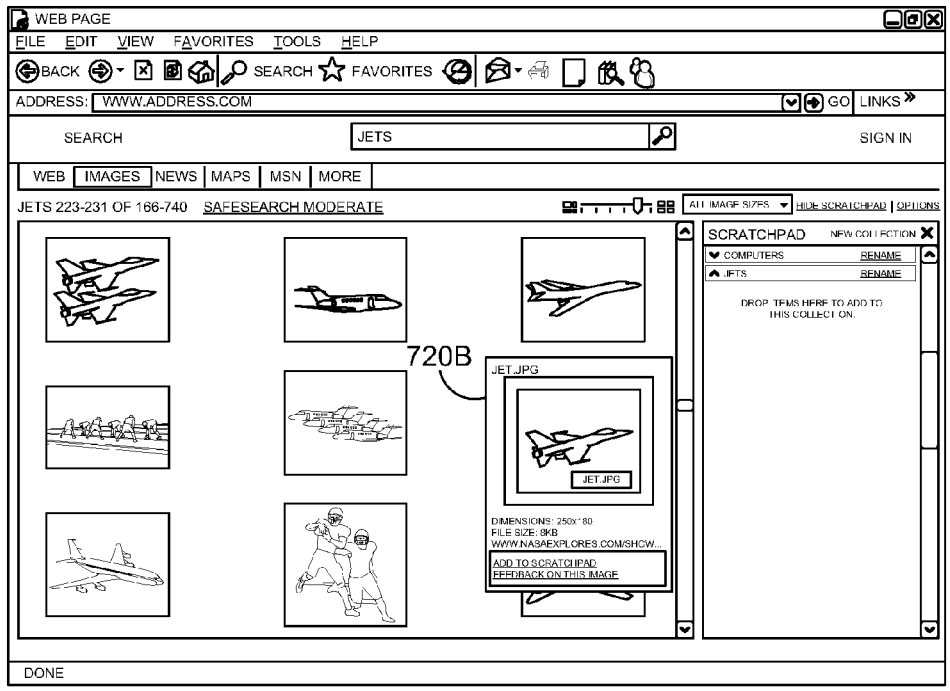
Figure 7C:
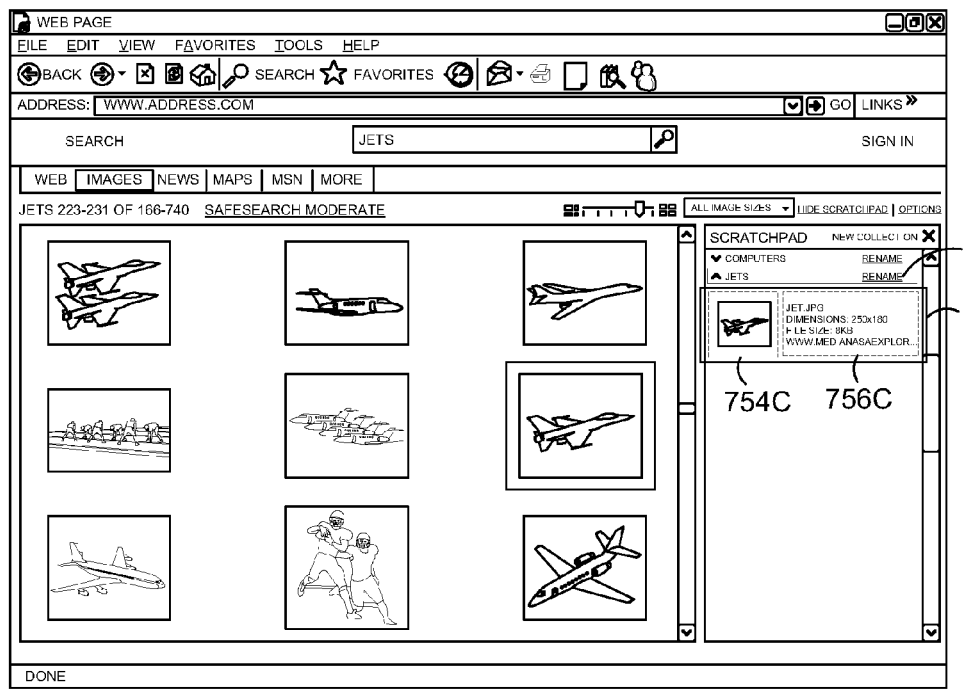

Turning now to FIGS. 7A-7E, exemplary screen displays are shown illustrating the arrangement of online media content in a virtual workspace associated with a display, in accordance with an embodiment of the present invention. Referring initially to FIG. 7A, a web browser display 700 is shown having two reference groups, a first group 740A entitled "computers" and a second group 750A entitled "Jets", the first group 740A being hidden from view. With reference to FIG. 7B, an online media content item 720B is shown to highlight that content item 720B may be coded with an ability to provide the preference indicator directly from the display, along with additional information about the item, as desired. FIG. 7C depicts a reference 752C added to reference group 750C, wherein the reference includes a representation 754C and a set of information 756C related to the reference.

Figure 7D:
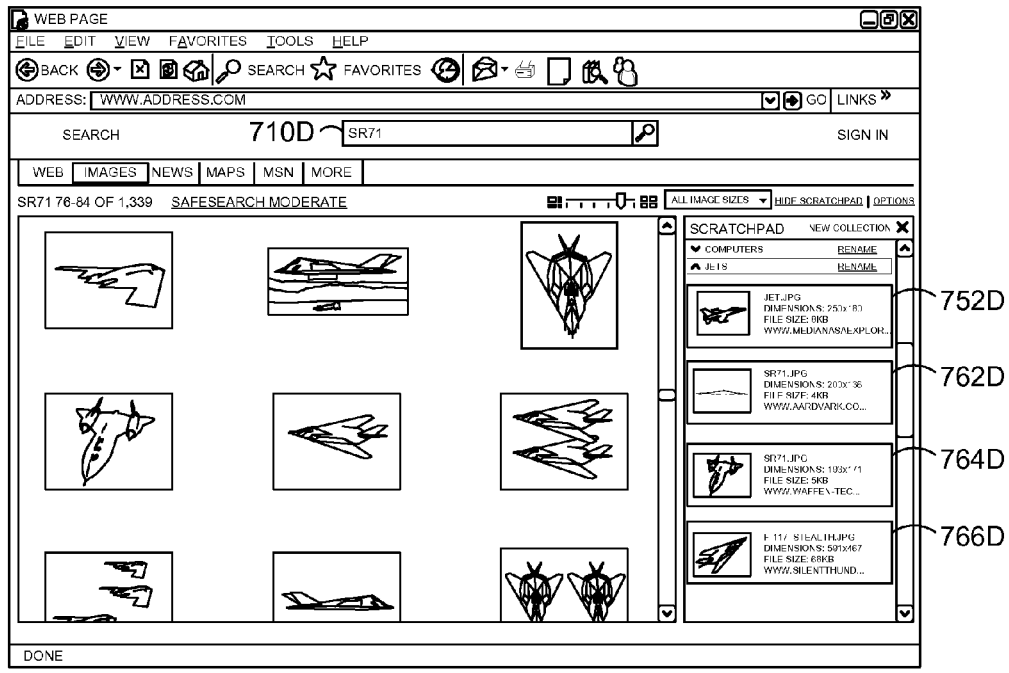
Figure 7E:
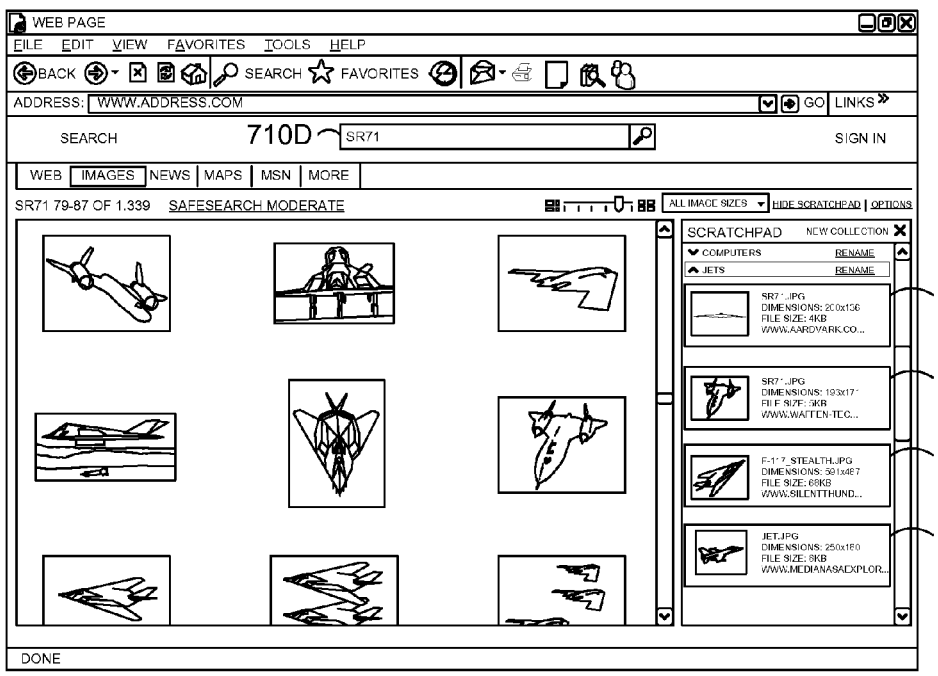

With reference to FIG. 7D, a new search term has been input into search term receiving and display area 710D to show that the groupings in the virtual workspace do not necessarily have to keep the same labels as the search term. In this example, "SR71" has been entered as search term 710D, but additional references have been added to reference group 750D (which was labeled "Jets" as it was when it was created). There are also a plurality of references 752D, 762D, 764D, and 766D, now displayed. In FIG. 7E, the order of the individual references has been modified so that reference 752E appears on the bottom of the display and references 762E, 764E and 766E have all been moved accordingly. As previously stated, there are a number of ways the display may be modified and the above figures are intended to be illustrative rather than limiting in nature.

Accordingly, in one embodiment, the present invention provides one or more computer storage media having computer-executable instructions embodied thereon for performing a method for generating references to online content items. The method includes presenting a plurality of online content items, receiving a first preference indicator associated with a first one of the plurality of online content items, generating a first reference to the first one of the plurality of content items associated with the preference indicator, storing the first reference in association with a virtual workspace, the virtual workspace having a display area associated therewith, and displaying one or more representations related to the first reference in association with the display area.

Embodiments of the present invention further provide a method for making online media content associated with a web-browsing application available to a target software application. The method includes providing a virtual workspace associated with the web-browsing application, storing at least one reference associated with an online content item in association with the virtual workspace, receiving an indicator from the target software application that access to the at least one reference is desired, providing a virtual workspace associated with the target software application, and displaying one or more representations of the at least one reference in association with the virtual workspace associated with the target software application.

Still further, embodiments of the present invention provide a computer system embodied on one or more computer storage media having computer-executable instructions embodied thereon for performing a method for generating virtual workspaces that facilitate re-visitation of online media content encountered through a web-browsing application. The system includes a virtual workspace generating component for generating a virtual workspace having one or more references to respective instances of online media content associated therewith; a display rendering component for rendering a display area associated with the virtual workspace, the display area including one or more representations associated with each of the one or more references; a selection receiving component for receiving an indication that one of the one or more references has been selected; a directing component for directing the web-browsing application to an original or updated URL associated with the selected reference; and a data store for storing the one or more references and their respective one or more representations in association with the virtual workspace.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable storage media having computer-executable instructions embodied thereon that, when executed by a computing device having a processor and a memory perform a method for generating references to online content items in a web-browsing application, the method comprising:

receiving a search query in the web-browsing application;

presenting a plurality of online content items associated with the search query;

receiving a first preference indicator associated with a first one of the plurality of online content items;

generating a first reference to the first one of the plurality of content items associated with the preference indicator;

storing the first reference in association with a virtual workspace, wherein the virtual workspace is accessible from a plurality of applications other than the web-browsing application;

generating one or more representations of the first reference, wherein at least one of the one or more representations includes resized images of an original picture, reformatted pictures that use a less-memory-intensive file format, thumbnail images of standard format and size, or thumbnail images specifically suited to the individual reference;

generating a display area in association with the web-browsing application, the display area presenting the one or more representation of the first reference;

subsequent to generating the display area in association with the web-browsing application, receiving a request from a target software application other than the web-browsing application that access to the virtual workspace is desired, wherein the request is automatically received upon initiation of the target software application; and recalling the display area generated in association with the web-browsing application and presenting the display area in association with the target software application, wherein a user is able to interact with the one or more representations while utilizing the target software application.

2. The one or more computer-readable storage media of claim 1, wherein the method further comprises:

receiving a second preference indicator associated with a second one of the plurality of online content items;

generating a second reference to the second one of the plurality of content items;

storing the second reference in association with the virtual workspace; and displaying one or more representations related to the second reference in association with the display area.

3. The one or more computer-readable storage media of claim 2, wherein the method further comprises:

receiving an indication to perform a specified action with respect to one or more of the first and second references; and performing the specified action.

4. The one or more computer-readable storage media of claim 3, wherein the specified action is one of deletion of the one or more representations related to one of the first and second references and organizing the respective one or more representations related to the first and second references.

5. The one or more computer-readable storage media of claim 4, wherein organizing the respective one or more representations related to the first and second references includes generating a plurality of references groups.

6. The one or more computer-readable storage media of claim 5, wherein the method further comprises hiding the representations associated with at least one of the plurality of reference groups from view.

7. The one or more computer-readable storage media of claim 1, wherein each of the plurality of online content items comprises a picture, audio content, video content, streaming media content, an icon, an animated graphic, or any combination thereof.

8. The one or more computer-readable storage media of claim 1, wherein the virtual workspace is stored locally in association with an individual computing device.

9. The one or more computer-readable storage media of claim 1, wherein the virtual workspace is stored in association with a web-browser cookie file associated with a user.

10. The one or more computer-readable storage media of claim 1, wherein the virtual workspace is stored in association with server.

11. A method for making online media content associated with a web-browsing application available to a target software application other than the web-browsing application, the method comprising:

generating a virtual workspace associated with the web-browsing application the virtual workspace having a display area associated therewith;

storing at least one reference associated with an online content item in association with the virtual workspace;

generating one or more representations of the at least one reference, wherein at least one of the one or more representations includes resized images of an original picture, reformatted pictures that use a less-memory-intensive file format, thumbnail images of standard format and size, or thumbnail images specifically suited to the individual reference;

receiving an indicator from the target software application other than the web-browsing application that access to the virtual workspace is desired;

providing the virtual workspace and its associated display area in association with the target software application;

receiving an indication from the target software application to perform a specified action with respect to the at least one reference;

performing the specified action with respect to the at least one reference;

subsequent to performing the specified action with respect to the at least one reference, receiving an indication from the web-browsing application that access to the virtual workspace associated therewith is desired; and providing the virtual workspace and its associated display space in association with the web-browsing application, wherein the specified action with respect to the at least one reference performed in association with the target software application is automatically displayed in the virtual workspace associated with the web-browsing application.

12. The method of claim 11, wherein, the specified action includes one of deleting the at least one reference and organizing the at least one reference relative to at least one additional reference.

13. A system for performing a method for generating virtual workspaces that facilitates re-visitation of online media content encountered through a web-browsing application, the system comprising:

a computing device including a processor and one or more computer-readable storage media; and a data store coupled with the computing device, wherein the computing device:

(A) generates a virtual workspace in the web-browsing application, the virtual workspace having one or more references to respective instances of online media content associated therewith, the online media content generated by the web-browsing application;

(B) receives an indication from a target software application other than the web-browsing application that access to the virtual workspace and the one or more references to respective instances of online media content associated therewith is desired;

(C) renders a display area associated with the virtual workspace in the target application other than the web-browsing application, the display area comprising one or more representations associated with the one or more references to respective instances of online media content, wherein at least one of the one or more representations includes resized images of an original picture, reformatted pictures that use a less-memory-intensive file format, thumbnail images of standard format and size, or thumbnail images specifically suited to the individual reference;

(D) receives an indication from the target software application that one of the one or more representations has been selected; and (E) directs the target software application to an original or updated URL associated with the selected representation;

wherein the data store stores the one or more references and their respective one or more representations in association with the virtual workspace.

14. The computer system of claim 13, wherein the data store is associated with an individual computing device.

15. The computer system of claim 13, wherein the data store is associated with a web-browser cookie file associated with a user.

16. The computer system of claim 13, wherein the data store is associated with one or more servers.

17. The computer system of claim 13, wherein information related to one or more references is stored in association with the virtual workspace, the additional information including one or more of a file size, a representation size, a file name, a set of dimensions, a duration, a file format, another metadata item, and any combination thereof.

* * * * *